(12) United States Patent
van Loosbroek et al.

(10) Patent No.: US 12,348,077 B1
(45) Date of Patent: Jul. 1, 2025

(54) SYSTEMS AND METHODS FOR CONTROLLING HOME ENERGY MANAGEMENT SYSTEMS THAT INCLUDE DARK START ENERGY STORAGE RESOURCES

(71) Applicant: FORD GLOBAL TECHNOLOGIES, LLC, Dearborn, MI (US)

(72) Inventors: Trevor van Loosbroek, Rochester, MI (US); Timothy Harris, Grosse Ile, MI (US); Haider Mhiesan, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 16 days.

(21) Appl. No.: 18/443,734

(22) Filed: Feb. 16, 2024

(51) Int. Cl.
*H02J 9/00* (2006.01)
*H02J 7/00* (2006.01)

(52) U.S. Cl.
CPC .......... *H02J 9/002* (2013.01); *H02J 7/00036* (2020.01); *H02J 7/0063* (2013.01); *H02J 9/005* (2013.01); *H02J 2207/50* (2020.01); *H02J 2310/48* (2020.01)

(58) Field of Classification Search
CPC ........ H02J 9/002; H02J 9/005; H02J 7/00036; H02J 7/0063; H02J 2207/50; H02J 2310/48
USPC .......................................................... 307/66
See application file for complete search history.

(56) References Cited

U.S. PATENT DOCUMENTS

| | | | |
|---|---|---|---|
| 7,960,857 B2 | 6/2011 | King | |
| 8,872,379 B2 | 10/2014 | Ruiz et al. | |
| 9,573,476 B2 | 2/2017 | Timpf, Jr. et al. | |
| 10,086,709 B2 | 10/2018 | Roberts et al. | |
| 10,457,155 B2 | 10/2019 | Wu et al. | |
| 2015/0329008 A1 | 11/2015 | Karlson et al. | |
| 2021/0276442 A1 | 9/2021 | Schroeder et al. | |
| 2022/0060048 A1 | 2/2022 | Narla et al. | |
| 2023/0170726 A1 | 6/2023 | Harris et al. | |
| 2024/0146089 A1* | 5/2024 | Young | H02J 7/00306 |

* cited by examiner

*Primary Examiner* — Hal Kaplan
(74) *Attorney, Agent, or Firm* — David B. Kelley; Carlson, Gaskey & Olds, P.C.

(57) ABSTRACT

Bidirectional energy transfer systems are provided for transferring energy between an electrified vehicle and other structures. The bidirectional energy transfer system may include a home energy management system having a dark start energy storage resource. The home energy management system may enter hibernation mode when the dark start energy storage resource reaches a low power state. The home energy management system may subsequently exit hibernation mode using a variety of recovery strategies when the electrified vehicle returns to the structure or near when the vehicle is expected to return to the structure. Placing the home energy management system in hibernation mode ensures that the dark start energy storage resource will have a sufficient amount of energy for powering system loads necessary to initiate the energy transfer from the vehicle to the structure during the grid power outage.

20 Claims, 7 Drawing Sheets

SYSTEMS AND METHODS FOR CONTROLLING HOME ENERGY MANAGEMENT SYSTEMS THAT INCLUDE DARK START ENERGY STORAGE RESOURCES

TECHNICAL FIELD

This disclosure relates generally to bidirectional energy transfer systems capable of transferring energy between an electrified vehicle and other structures.

BACKGROUND

Plug-in type electric vehicles include one or more charging interfaces for charging a traction battery pack. Plug-in vehicles are typically charged while parked at a charging station or some other utility power source. Plug-in vehicles can also be used to support household loads during electrical power outages.

SUMMARY

A bidirectional energy transfer system according to an exemplary aspect of the present disclosure includes, among other things, a home energy management system including a dark start energy storage resource, and a control module programmed to command the home energy management system to enter a hibernation mode to preserve an energy level of the dark start energy storage resource during a grid power outage condition.

In a further non-limiting embodiment of the foregoing bidirectional energy transfer system, the control module is a component of a combiner box of the home energy management system.

In a further non-limiting embodiment of either of the foregoing bidirectional energy transfer systems, the dark start energy storage resource is a battery, a capacitor, or a supercapacitor.

In a further non-limiting embodiment of any of the foregoing bidirectional energy transfer systems, the control module is programmed to command a switch of the home energy management system to an open state that disconnects the dark start energy storage resource from a downstream load to enter the hibernation mode.

In a further non-limiting embodiment of any of the foregoing bidirectional energy transfer systems, the control module is programmed to command the switch to the open state when a state of charge of the dark start energy storage resource falls below a predefined state of charge threshold during the grid power outage condition.

In a further non-limiting embodiment of any of the foregoing bidirectional energy transfer systems, the home energy management system includes a recovery circuit configured for exiting the home energy management system from the hibernation mode.

In a further non-limiting embodiment of any of the foregoing bidirectional energy transfer systems, the recovery circuit is configured to command a switch of the home energy management system to a closed state that connects the dark start energy storage resource to a downstream load to exit the hibernation mode.

In a further non-limiting embodiment of any of the foregoing bidirectional energy transfer systems, the recovery circuit includes a manually actuated switch.

In a further non-limiting embodiment of any of the foregoing bidirectional energy transfer systems, the recovery circuit includes a communication line adapted to deliver a trigger signal from an electrical vehicle supply equipment (EVSE) to the switch.

In a further non-limiting embodiment of any of the foregoing bidirectional energy transfer systems, the recovery circuit includes a low power timer circuit configured to send a trigger signal to the switch when a time window has expired.

In a further non-limiting embodiment of any of the foregoing bidirectional energy transfer systems, the time window is a learned time window.

In a further non-limiting embodiment of any of the foregoing bidirectional energy transfer systems, the control module is further programmed to initiate communications between an electric vehicle supply equipment (EVSE) and an electrified vehicle after exiting the hibernation mode.

A method according to another exemplary aspect of the present disclosure includes, among other things, commanding a home energy management system to enter a hibernation mode during a grid power outage condition when a dark start energy storage resource reaches a low power state. During the hibernation mode, the dark start energy storage resource is disconnected from all system loads associated with the home energy management system.

In a further non-limiting embodiment of the foregoing method, the dark start energy storage resource reaches the low power state when a state of charge of the dark start energy storage resource falls below a predefined state of charge threshold during the grid power outage condition.

In a further non-limiting embodiment of either of the foregoing methods, commanding the home energy management system to enter the hibernation mode includes commanding a switch of the home energy management system to an open state that disconnects the dark start energy storage resource from the system loads.

In a further non-limiting embodiment of any of the foregoing methods, the method includes commanding the home energy management system to exit the hibernation mode when a vehicle has returned or is expected to soon return to a structure associated with the home energy management system.

In a further non-limiting embodiment of any of the foregoing methods, commanding the home energy management system to exit the hibernation mode includes commanding a switch of the home energy management system to a closed state that reconnects the dark start energy storage resource to the system loads.

In a further non-limiting embodiment of any of the foregoing methods, the switch is transitioned to the closed state when a button is manually actuated.

In a further non-limiting embodiment of any of the foregoing methods, the switch is transitioned to the closed state in response to a trigger signal received from a communication line from an electric vehicle supply equipment (EVSE).

In a further non-limiting embodiment of any of the foregoing methods, the switch is transitioned to the closed state in response to a trigger signal received from a low power timer circuit.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to bidirectional energy transfer systems capable of transferring energy between an electrified vehicle and other structures. The bidirectional energy transfer system may include a home energy management system having a dark start energy storage resource. The home energy management system may enter hibernation mode when the dark start energy storage resource reaches a low power state. The home energy management system may subsequently exit hibernation mode using a variety of recovery strategies when the electrified vehicle returns to the structure or near when the vehicle is expected to return to the structure. Placing the home energy management system in hibernation mode ensures that the dark start energy storage resource will have a sufficient amount of energy for powering system loads necessary to initiate the energy transfer from the vehicle to the structure during the grid power outage. These and other features of this disclosure are discussed in greater detail in the following paragraphs of this detailed description.

Figure 1:
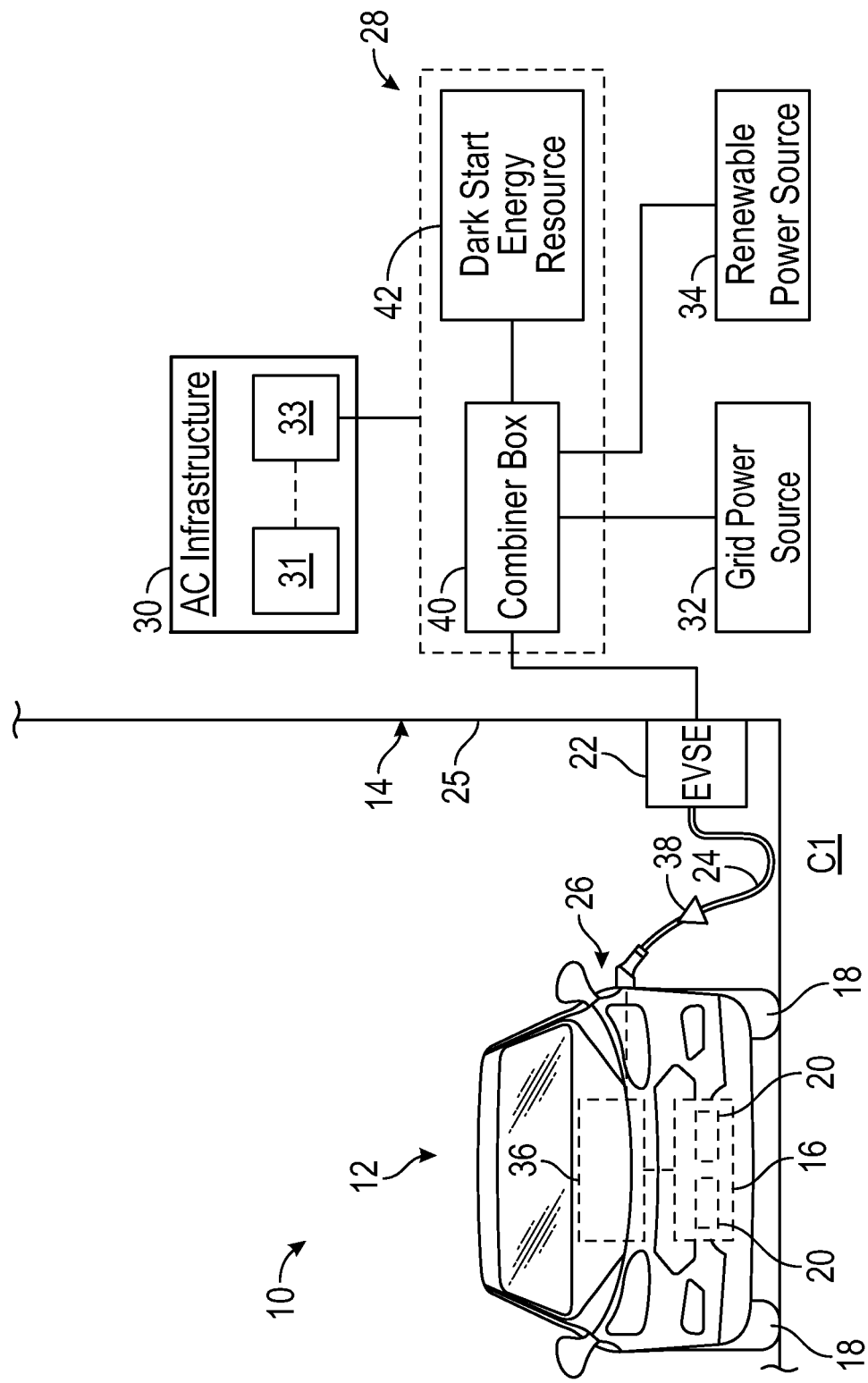
FIG. 1 schematically illustrates a first configuration of a bidirectional energy transfer system.
Figure 2:
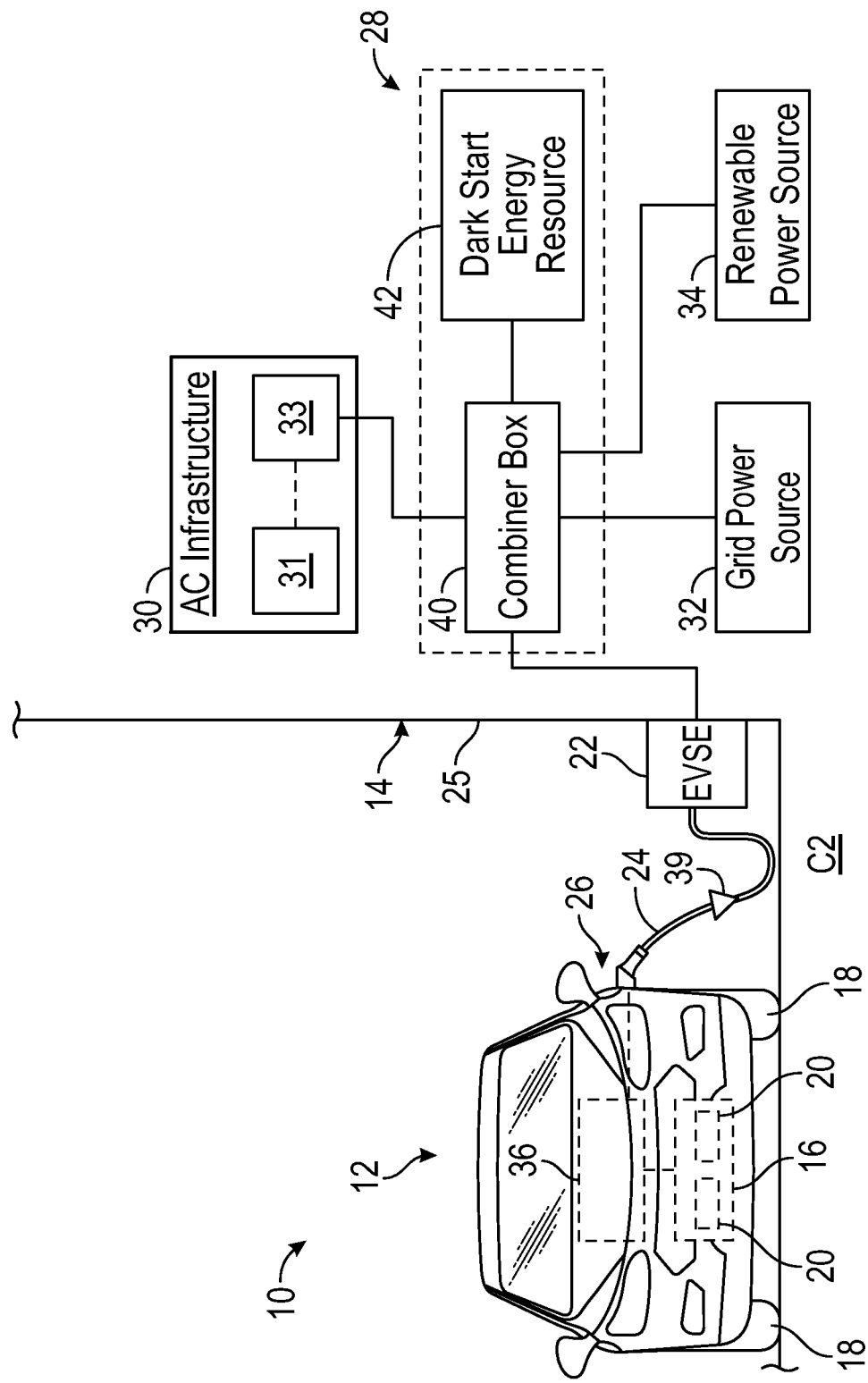
FIG. 2 schematically illustrates a second configuration of the bidirectional energy transfer system of FIG. 1.

FIGS. 1 and 2 schematically illustrate an exemplary bidirectional energy transfer system 10 (hereinafter "the system 10") for bidirectionally transferring energy between a vehicle 12 and a structure 14. The system 10 enables the bidirectional transfer of energy from the vehicle 12 to the structure 14 or vice versa. The structure 14 may be a residential building, a commercial building, a parking garage, a charging station, or any other type of structure that is capable of receiving or transferring energy. In an embodiment, the structure 14 is a residential household that functions as a "home location" of the vehicle 12.

Although a specific component relationship is illustrated in the figures of this disclosure, the illustrations are not intended to limit this disclosure. The placement and orientation of the various components of the depicted system are shown schematically and could vary within the scope of this disclosure. In addition, the various figures accompanying this disclosure are not necessarily drawn to scale, and some features may be exaggerated or minimized to emphasize certain details of a particular component, assembly, or system.

In an embodiment, the vehicle 12 is a plug-in type electric vehicle (e.g., a plug-in hybrid electric vehicle (PHEV) or a battery electric vehicle (BEV)). The vehicle 12 includes a traction battery pack 16 that is part of an electrified powertrain capable of applying a torque from an electric machine (e.g., an electric motor) for driving wheels 18 of the vehicle 12. The electrified powertrain of the vehicle 12 may electrically propel the set of wheels 18 either with or without the assistance of an internal combustion engine.

The vehicle 12 of FIGS. 1-2 is schematically illustrated as a car. However, other vehicle configurations are also contemplated. The teachings of this disclosure may be applicable for any type of vehicle as the vehicle 12. For example, the vehicle 12 could be configured as a car, a pickup truck, a van, a sport utility vehicle (SUV), etc.

Although shown schematically, the traction battery pack 16 may be configured as a high voltage traction battery pack that includes a plurality of battery arrays 20 (e.g., battery assemblies or groupings of battery cells) capable of outputting electrical power to one or more electric machines of the vehicle 12. Other types of energy storage devices and/or output devices may also be used to electrically power the vehicle 12.

The vehicle 12 may interface with the structure 14 through electric vehicle supply equipment (EVSE) 22 in order to perform the bidirectional energy transfers of the system 10. In an embodiment, the EVSE 22 is a wall box that may be mounted to a wall 25 of the structure 14. A charge cable 24 may operably connect the EVSE 22 to a charge port assembly 26 of the vehicle 12 for transferring energy between the vehicle 12 and the structure 14. The charge cable 24 may be configured to provide any level of charging (e.g., 120 VAC, 240 VAC, Direct Current (DC) charging, etc.).

The EVSE 22 may be operably connected to an AC infrastructure 30 of the structure 14 through a home energy management system 28. The home energy management system 28 may include a combiner box 40, which is a type of bidirectional energy transfer module. Various electrical loads 31, such as household appliance loads, for example, may be associated with the AC infrastructure 30. The electrical loads 31 may sometimes be referred to as transient loads of the AC infrastructure 30 and could include loads associated with common kitchen appliances, washers, dryers, water heaters, air conditioning units, furnaces, home alarms systems, sump pump systems, routers, home lighting systems, etc. The AC infrastructure 30 may further include a main service panel 33 that is operably positioned between the combiner box 40 and the electrical loads 31.

Power from a grid power source 32 (e.g., AC power), a renewable power source 34 (e.g., solar power, wind power, etc.), the vehicle 12, or some combination of these may be selectively transferred to the AC infrastructure 30 for powering the electrical loads 31. The combiner box 40 can control power transfer to the AC infrastructure 30. The combiner box 40 can in some implementations further control power transfer to the grid power source 32. For example, power from the vehicle 12 could periodically be transferred through the combiner box 40 back to the grid power source 32.

The combiner box 40 may function as a junction between the AC infrastructure 30 and each of the grid power source 32, the vehicle 12, and the renewable power source 34. The combiner box 40 can electrically isolate the AC infrastructure 30 from the grid power source 32 during a grid power outage condition and can control the electrical loads 31 ON and OFF. In an embodiment, the combiner box 40 can activate a transfer switch to decouple the grid power source 32 from the electrical loads 31, and then transfer power from the renewable power source 34, the vehicle 12, or both to the electrical loads 31.

Power received from or transferred to the vehicle 12 may be transferred through the combiner box 40. The combiner box 40 is configured to aid bidirectional transfers of electrical energy between the vehicle 12 and the structure 14. The home energy management system 28 may include various equipment necessary for achieving the transfers of energy to/from the vehicle 12.

The vehicle 12 may further include a vehicle power transfer system 36 configured for further enabling the bidirectional transfer of power between the vehicle 12 and the structure 14. The vehicle power transfer system 36 may be operably connected between the charge port assembly 26 and the traction battery pack 16 of the vehicle 12. The vehicle power transfer system 36 may include various equipment for enabling the vehicle 12 to act as a backup power source for transferring power to the structure 14, such as a charger, a converter, an inverter, HV relays or contactors, a motor controller (which may be referred to as an inverter system controller or ISC), etc. The vehicle power transfer system 36 may further be configured to enable the vehicle 12 to receive power from the structure 14 and for transferring energy between the traction battery pack 16 and one or more electric motors of the vehicle 12.

One non-limiting example of a suitable vehicle power transfer system that may be employed for use within the vehicle 12 for achieving bidirectional power transfers is disclosed within US Patent Publication No. 2020/0324665, assigned to Ford Global Technologies, LLC, the disclosure of which is incorporated herein by reference. However, other power transfer systems could also be utilized for achieving bidirectional power transfers within the scope of this disclosure.

FIG. 1 schematically illustrates a first configuration C1 of the system 10. During the first configuration C1, power may be transferred from the structure 14 to the vehicle 12, such as for charging the traction battery pack 16 of the vehicle 12. The direction of energy transfer during the first configuration C1 is schematically depicted by arrow 38.

FIG. 2 schematically illustrates a second configuration C2 of the system 10. During the second configuration C2, power may be transferred from the traction battery pack 16 of the vehicle 12 to the structure 14. The direction of energy transfer during the second configuration C2 is schematically illustrated by arrow 39. In this way, the vehicle 12 may be employed as a backup energy management system for powering the electrical loads 31 of the structure 14, such as when power from the grid power source 32 is temporarily unavailable as a result of electrical blackouts, for example.

As can be appreciated, the combiner box 40 and other loads of the home energy management system 28 are ordinarily powered by the grid power source 32. During a grid power outage condition where energy from the grid power source 32 is temporarily unavailable, the combiner box 40 still needs to be powered to be able to detect the vehicle 12 and to communicate with the EVSE 22 for transferring power from the vehicle 12 to the structure 14. This is sometimes referred to as a "dark start."

The home energy management system 28 may additionally include a dark start energy storage resource 42 that is operably connected to the combiner box 40. Although shown separately from the combiner box 40 in FIGS. 1-2, the combiner box 40 and the dark start energy storage resource 42 could be integrated together as part of a common module.

The dark start energy storage resource 42 may be capable of supplying a limited amount of backup power to certain components of the system 10, such as the combiner box 40, for example, when power is unavailable from either the grid power source 32 or any other energy resource (e.g., the renewable power source 34, the vehicle 12, etc.). The dark start energy storage resource 42 may include a battery (e.g., a 13V battery), a capacitor, a supercapacitor or any other suitable energy storage device.

The dark start energy storage resource 42 is typically only capable of supplying power for a relatively limited amount of time (e.g., about 24 hours) during a grid power outage condition. If the vehicle 12 does not return to the structure 14 until after the dark start energy storage resource 42 energy levels becomes depleted, the system 10 could become inoperable and thus unable to support the structure 14 with energy from the vehicle 12 during the grid power outage condition. This disclosure is therefore directed to systems and methods for prolonging the functionality of the dark start energy storage resource 42 during grid power outage conditions.

Figure 3:
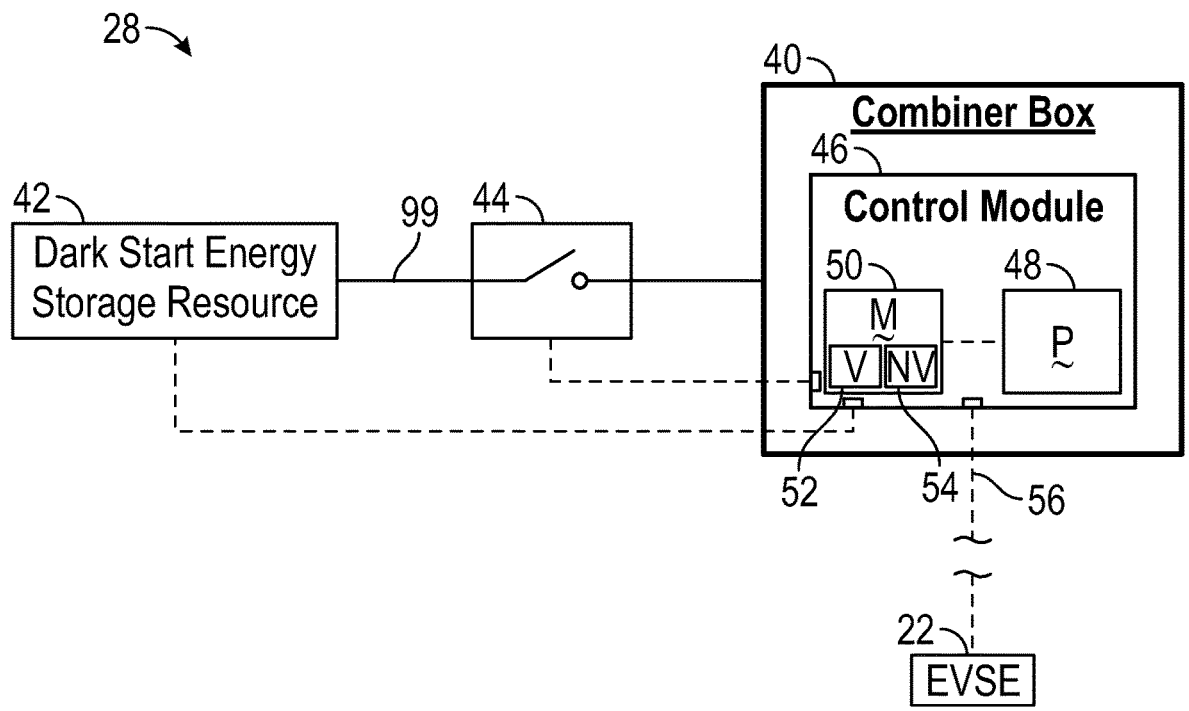
FIG. 3 schematically illustrates exemplary aspects of a home energy management system of the bidirectional energy transfer system of FIGS. 1 and 2.

Additional aspects of the home energy management system 28 of FIGS. 1-2 are schematically illustrated in FIG. 3. In addition to the combiner box 40 and the dark start energy storage resource 42, the home energy management system 28 may include one or more switches 44 and one or more control modules 46.

The switch 44 may be configured to selectively connect or disconnect the electrical conducting path 99 between the dark start energy storage resource 42 and the internal circuitry of the combiner box 40 and any other downstream system loads of the home energy management system 28. Example switches 44 include but are not limited to transistors, transistors, metal-oxide-semiconductor field-effect transistors (MOSFET), bipolar junction transistors (BJT), solid-state switches, relays, contactors, etc.

In an embodiment, the control module 46 is a component of the combiner box 40. However, other configurations are contemplated within the scope of this disclosure. Moreover, although shown schematically as a single control module, the home energy management system 28 could include a plurality of control modules that are operably linked and configured to function together for facilitating various control strategies associated with the home energy management system 28.

The control module 46 may include a processor 48 and non-transitory memory 50 for executing various control strategies and modes associated with the home energy management system 28. The processor 48 can be a custom made or commercially available processor, a central processing unit (CPU), or generally any device for executing software instructions.

The memory 50 can include a combination of volatile memory elements 52 and nonvolatile memory elements 54. Volatile memory elements 52 require power to store data, whereas nonvolatile memory elements 54 can store data without consuming power.

The processor 48 may be operably coupled to the memory 50 and may be configured to execute one or more programs stored in the memory 50 of the control module 46 based on the various inputs received from other devices, such as the EVSE 22, the dark start energy storage resource 42, the switch 44, etc.

The control module 46 may be programmed to automatically place the home energy management system 28 in a hibernation mode when power from the grid power source 32 is unavailable and the dark start energy storage resource 42 reaches a low power state. The dark start energy storage resource 42 may reach a low power state, for example, when a state of charge of the dark start energy storage resource 42 falls below a predefined state of charge threshold.

Placing the home energy management system 28 into hibernation mode may include copying all data in the memory 50 from the volatile memory elements 52 into the nonvolatile memory elements 54. This will protect from the loss of data when power is subsequently removed from the home energy management system 28.

Placing the home energy management system 28 into hibernation mode may further include commanding the switch 44 to an open state to disconnect the dark start energy storage resource 42 from the combiner box 40 and any other downstream loads of the home energy management system 28. Once the dark start energy storage resource 42 has been disconnected from all downstream loads, energy drain on the dark start energy storage resource 42 will be nearly negligible, thereby significantly prolonging the amount of time the dark start energy storage resource 42 can remain operable for supporting system loads during a given grid power outage condition.

The home energy management system 28 may remain in hibernation mode until it is necessary to deliver power back to the combiner box 40, such as for readying the system 10 for transferring energy from the vehicle 12 to the structure 14, for example. Exiting the home energy management system 28 from hibernation mode may include commanding the switch 44 to a closed state to reconnect the dark start energy storage resource 42 to the combiner box 40 and any other downstream loads. Once power is restored to the combiner box 40, the control module 46 wakes up and can start communications with the EVSE 22 over a combiner communication line 56 that can communicate data between the EVSE 22 and the combiner box 40. After a handshake between the combiner box 40 and the EVSE 22, the EVSE 22 can close relays to begin transferring power from the vehicle 12 to the combiner box 40. The home energy management system 28 is therefore capable of coordinating the transfer of energy from the vehicle 12 to the structure 14 even when a relatively large amount of time has passed between the time when the grid power outage condition begins and the time when the user reconnects the vehicle 12 to the system 10 by plugging the charge cable 24 of the EVSE 22 into the charge port assembly 26 of the vehicle 12.

Since the dark start energy storage resource 42 is disconnected from the downstream loads during hibernation mode, the power for triggering the switch 44 back to the closed state and thus delivering power back to the downstream loads must be provided in another manner. A multitude of recovery strategies (e.g., manual, automatic, scheduled, and learned) are contemplated for triggering the switch 44 and returning power back to the downstream loads and are further discussed below (see, e.g., FIGS. 5-8).

Figure 4:
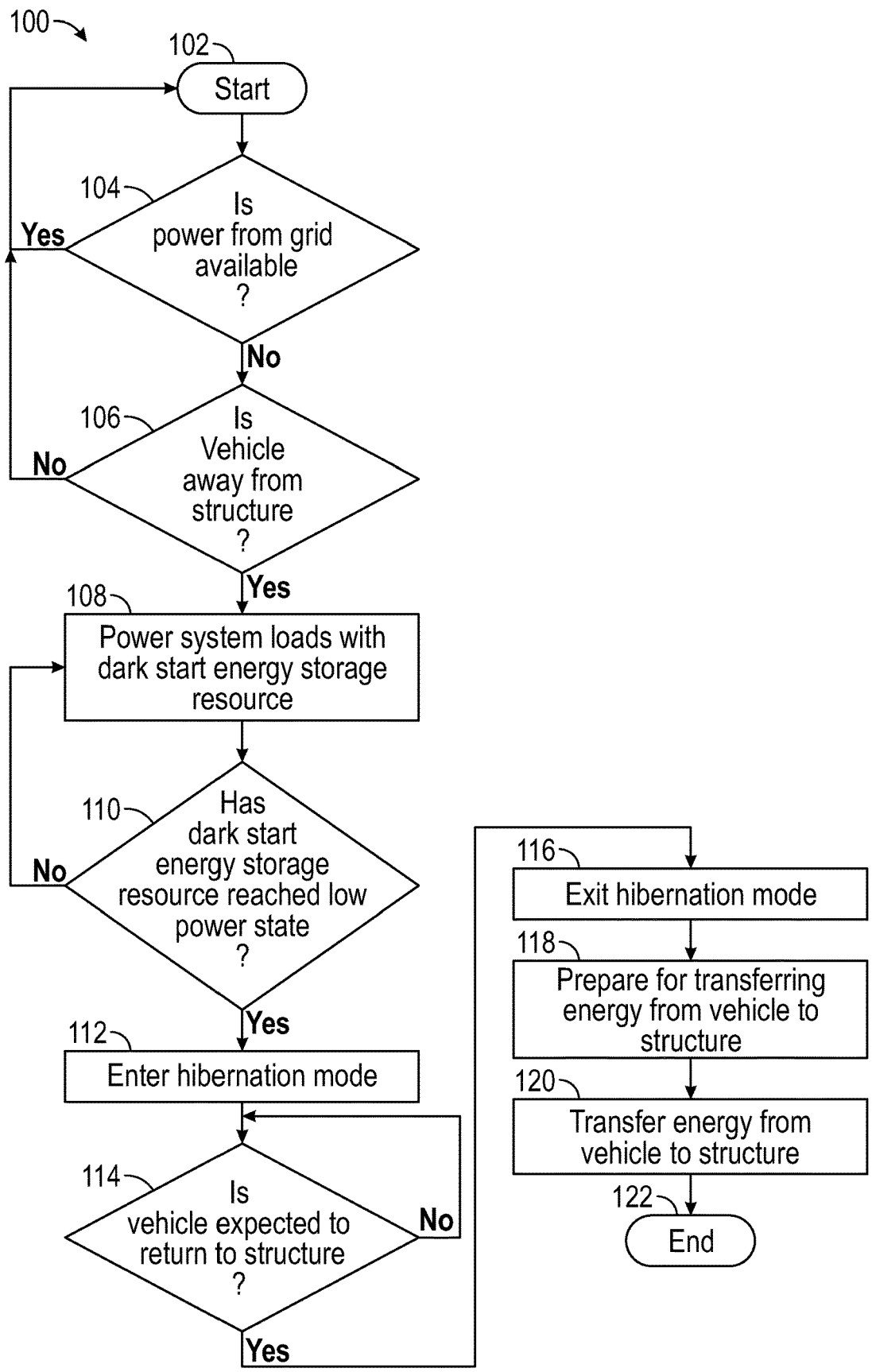
FIG. 4 is a flow chart of an exemplary method for controlling a home energy management system during a grid power outage condition.

FIG. 4, with continued reference to FIGS. 1-3, schematically illustrates in flow chart form an exemplary method 100 for controlling the home energy management system 28 during a grid power outage condition. The home energy management system 28 may be configured to employ one or more algorithms adapted to execute at least a portion of the steps of the exemplary method 100. For example, the method 100 may be stored as executable instructions in the memory 50 of the control module 46, and the executable instructions may be embodied within any computer readable medium that can be executed by the processor 48 of the control module 46.

The exemplary method 100 may begin at block 102. At block 104, the method 100 may confirm whether or not power is available from the grid power source 32. If NO, thus indicating a grid power outage condition, the method 100 may proceed to block 106 by determining whether or not the vehicle 12 is away from the structure 14 or expected to be away from the structure 14 during an upcoming time period. The method 100 may infer that the vehicle 12 is away from the structure 14 based on plug status signals from the EVSE 22, for example. The method 100 may alternatively infer that the vehicle 12 is away from the structure 14 based on known or learned calendar/schedule information associated with the user of the vehicle 12.

If block 106 returns a YES flag, the method 100 may proceed to block 108 by powering all system loads associated with the home energy management system 28 using power from the dark start energy storage resource 42. The method 100 may subsequently monitor whether the dark start energy storage resource 42 has reached a low power state at block 110. The low power state can be assumed, for example, when a state of charge of the dark start energy storage resource 42 is below a predefined state of charge threshold.

If a YES flag is returned at block 110, the method 100 may command the home energy management system 28 to enter hibernation mode at block 112. Entering hibernation mode may include copying all data in the memory 50 from the volatile memory elements 52 into the nonvolatile memory elements 54 and then commanding the switch 44 to the open state to disconnect the dark start energy storage resource 42 from all downstream loads of the home energy management system 28.

Next, at block 114, the method 100 may determine whether or not the vehicle 12 has returned or is expected to soon return to the structure 14. The method 100 may infer that the vehicle 12 has returned or is expected to soon return to the structure 14 based on plug status signals from the EVSE 22, a manual user input, an elapsed amount of time (either scheduled or learned), etc.

If a YES flag is returned at block 114, the method 100 may proceed to block 116 and command the home energy management system 28 to exit hibernation mode. Exiting hibernation mode may include commanding the switch 44 back to the closed state to reconnect the dark start energy storage resource 42 to downstream system loads. As further discussed below, the power for triggering the switch 44 back to the closed state may come from a source of power that is separate from the dark start energy storage resource 42 or any downstream system loads.

The method 100 may prepare the system 10 for transferring energy from the vehicle 12 to the structure 14 at block 118. The vehicle 12 can then transfer energy to return power to the structure 14 at block 120. The method 100 may end at block 122.

Figure 5:
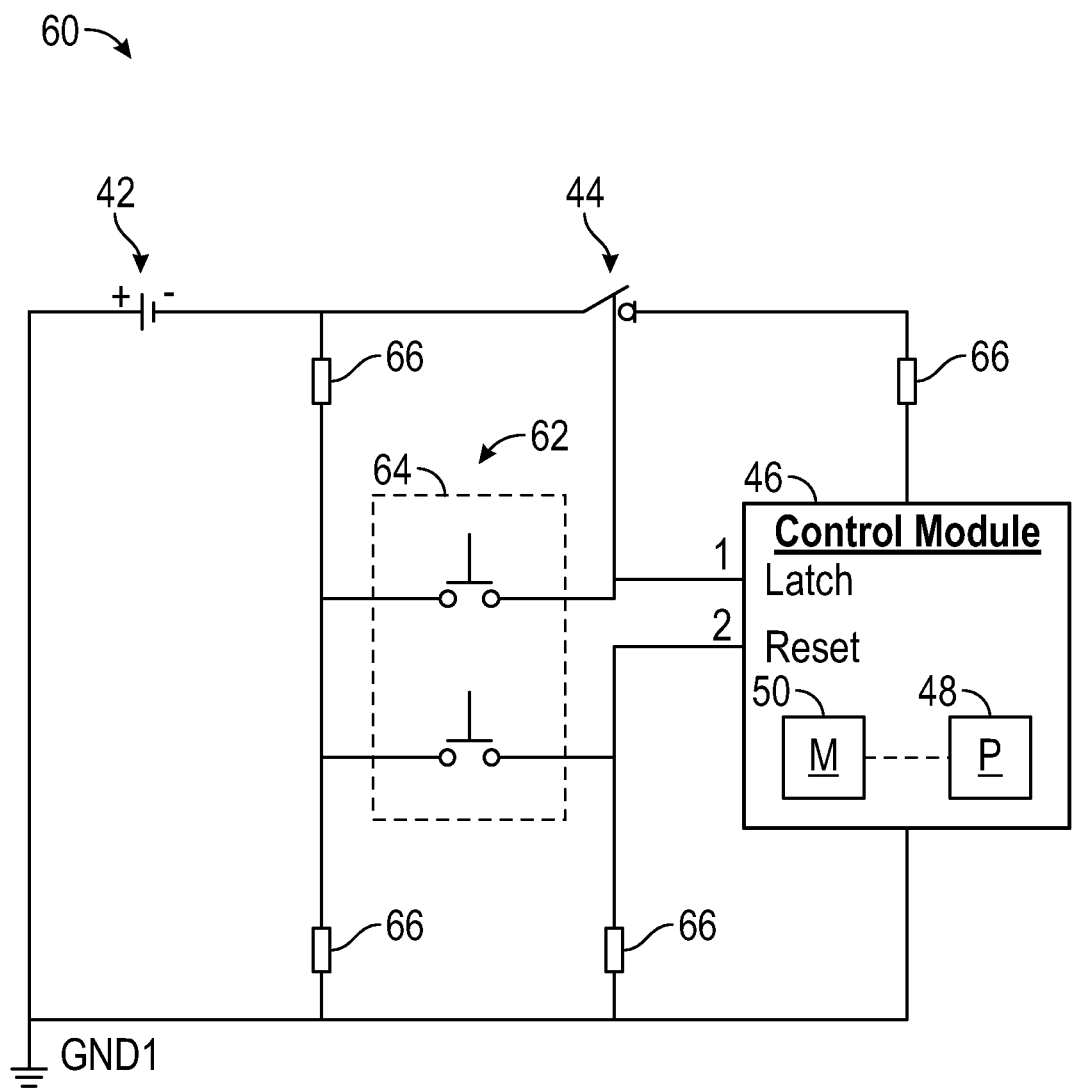
FIG. 5 schematically illustrates an exemplary recovery circuit of a home energy management system.

FIG. 5 illustrates an exemplary recovery circuit 60 that can be utilized as part of a manual recovery strategy for triggering the switch 44 and returning power to downstream loads upon exiting hibernation mode. The recovery circuit 60 may include a manually operable switch 62 that can be manually actuated by a user, such as by pushing a button 64 that can be located on the combiner box 40, for example. When the button 64 is pressed, the switch 44 is automatically triggered, thereby prompting the home energy management system 28 to exit the hibernation mode.

A plurality of resistors 66 may be strategically positioned throughout the recovery circuit 60. The resistors 66 may configured to provide voltage protection for grounding the recovery circuit 60, such as by reducing floating voltages, for example.

Figure 6:
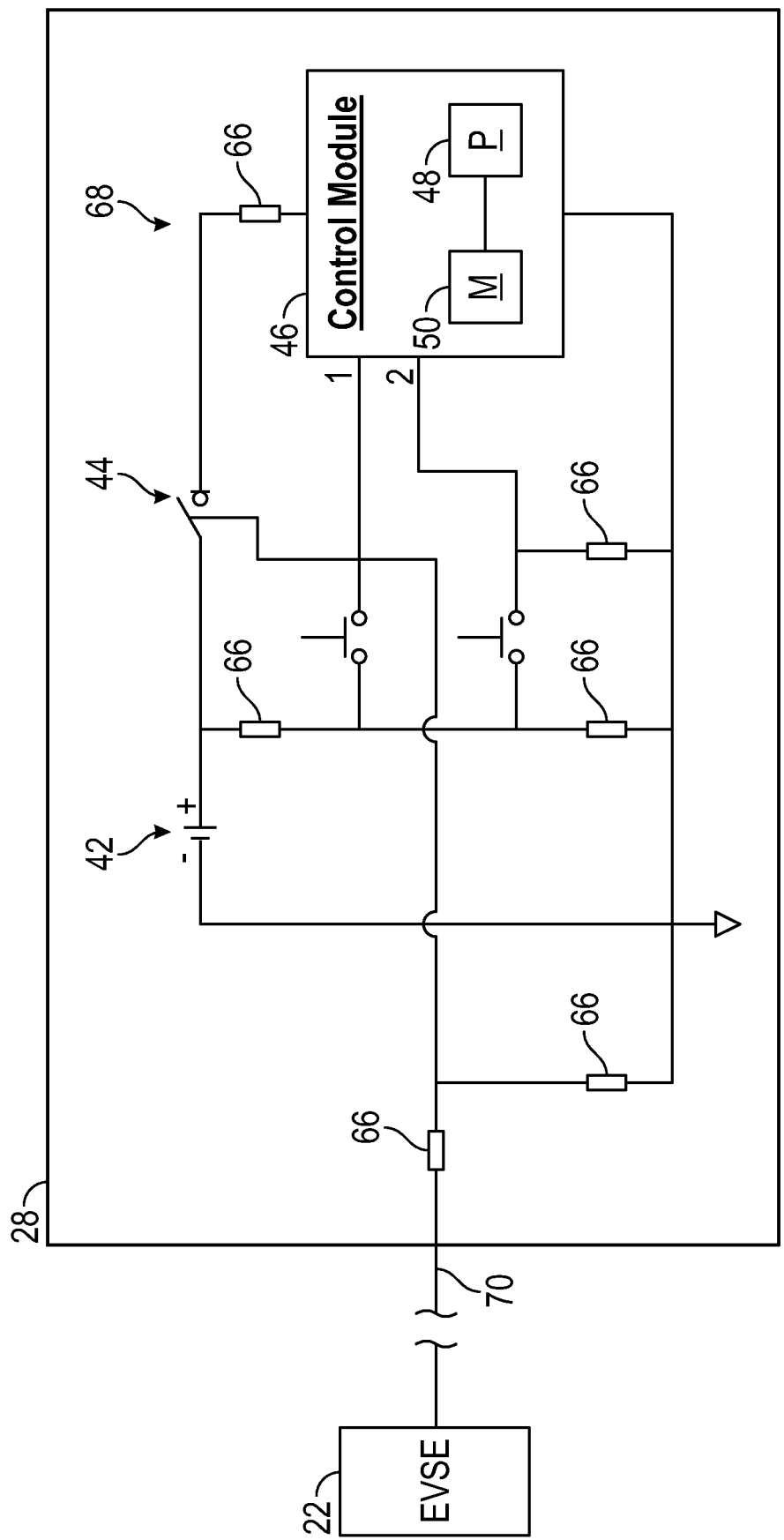
FIG. 6 schematically illustrates another exemplary recovery circuit of a home energy management system.

FIG. 6 illustrates another exemplary recovery circuit 68 that can be utilized as part of an automatic recovery strategy for triggering the switch 44 and returning power to downstream systems loads after exiting hibernation mode. The recovery circuit 68 may utilize a communications line 70 from the EVSE 22 to deliver the power necessary for triggering the switch 44 to the closed state. The communications line 70 may automatically send a trigger signal to the switch 44 when a user plugs the charge cable 24 of the EVSE 22 into the charge port assembly 26 of the vehicle 12, for example. The trigger signal delivers the power necessary for triggering the switch 44 to the closed state.

A plurality of resistors 66 may be strategically positioned throughout the recovery circuit 68. The resistors 66 may configured to provide voltage protection for grounding the recovery circuit 68, such as by reducing floating voltages, for example.

Figure 7:
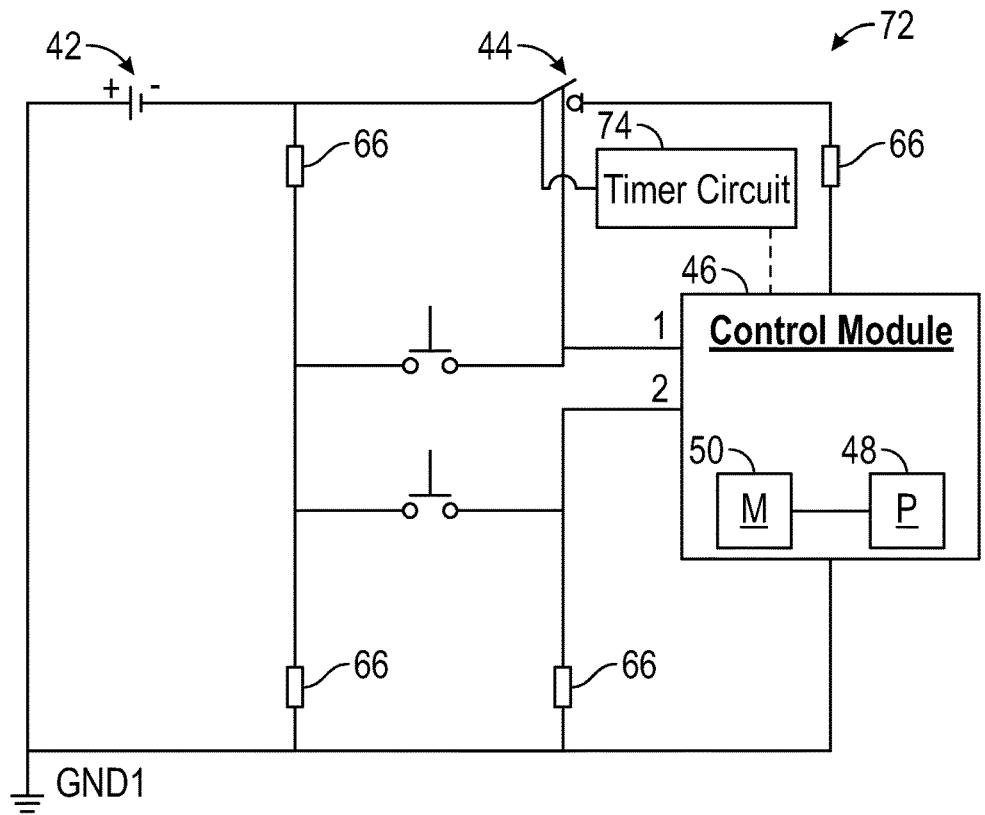
FIG. 7 schematically illustrates another exemplary recovery circuit of a home energy management system.

FIG. 7 illustrates another exemplary recovery circuit 72 that can be utilized as part of a scheduled recovery strategy for triggering the switch 44 and returning power to downstream loads upon exiting hibernation mode. The recovery circuit 72 may include a low power timer circuit 74 through which a user may preschedule a time window during which the vehicle 12 is expected to be away from the structure 14. The low power timer circuit 74 may automatically send a trigger signal to the switch 44 when the time window has expired. The trigger signal delivers the power necessary for triggering the switch 44 to the closed state.

A plurality of resistors 66 may be strategically positioned throughout the recovery circuit 72. The resistors 66 may configured to provide voltage protection for grounding the recovery circuit 72, such as by reducing floating voltages, for example.

Figure 8:
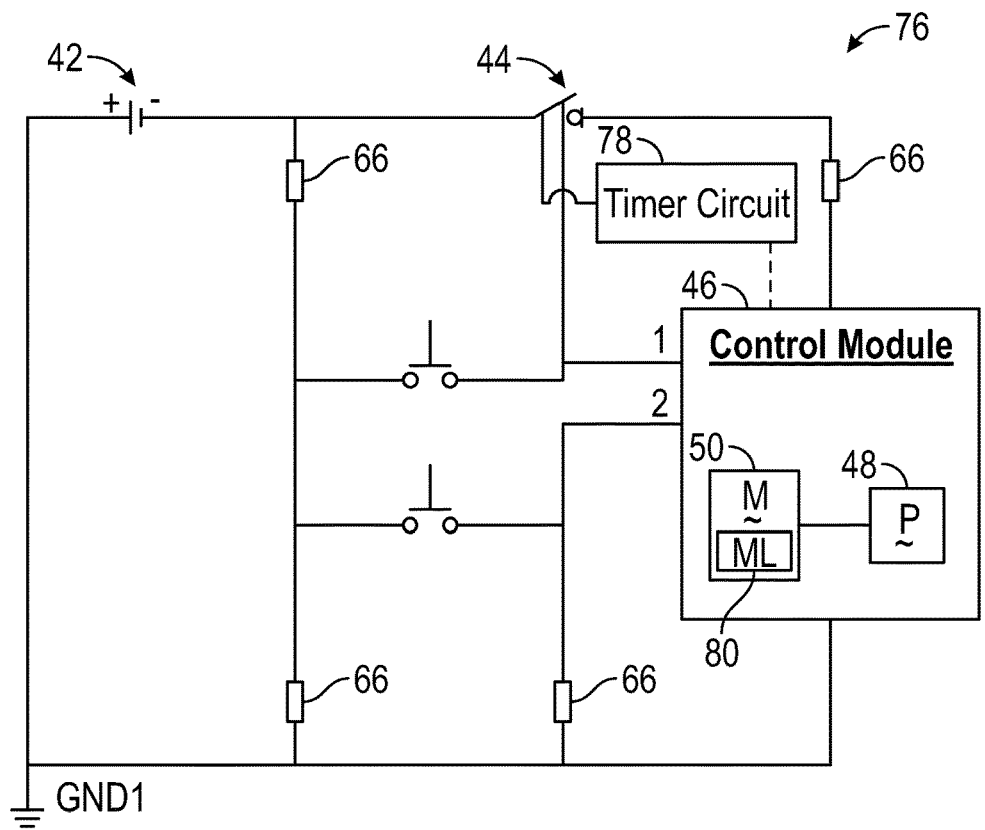
FIG. 8 schematically illustrates yet another exemplary recovery circuit of a home energy management system.

FIG. 8 illustrates another exemplary recovery circuit 76 that can be utilized as part of a learned recovery strategy for triggering the switch 44 and returning power to downstream loads upon exiting hibernation mode. The recovery circuit 76 may include a low power timer circuit 78. The processor 48 of the control module 46 may be programmed to execute a machine learning program 80 stored in the memory 50 to learn time windows in which the vehicle 12 is expected to be away from the structure 14. The learned time windows may be based on observed, predictable schedules for when the user has plugged the charge cable 24 into the vehicle 12 in the past. The low power timer circuit 78 may send a trigger signal to the switch 44 when the learned time window has expired. The trigger signal delivers the power necessary for triggering the switch 44 to the closed state.

A plurality of resistors 66 may be strategically positioned throughout the recovery circuit 76. The resistors 66 may configured to provide voltage protection for grounding the recovery circuit 76, such as by reducing floating voltages, for example.

The home energy management systems described herein include a dark start energy storage resource that can power system loads during grid power outage conditions. The dark start energy storage resource can be disconnected from all system loads during the grid power outages for prolonging its operability, thereby ensuring operability regardless of user interaction and increasing customer satisfaction.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A bidirectional energy transfer system, comprising:
a home energy management system including a dark start energy storage resource; and
a control module programmed to command the home energy management system to enter a hibernation mode to preserve an energy level of the dark start energy storage resource during a grid power outage condition.

2. The bidirectional energy transfer system as recited in claim 1, wherein the control module is a component of a combiner box of the home energy management system.

3. The bidirectional energy transfer system as recited in claim 1, wherein the dark start energy storage resource is a battery, a capacitor, or a supercapacitor.

4. The bidirectional energy transfer system as recited in claim 1, wherein the control module is programmed to command a switch of the home energy management system to an open state that disconnects the dark start energy storage resource from a downstream load to enter the hibernation mode.

5. The bidirectional energy transfer system as recited in claim 4, wherein the control module is programmed to command the switch to the open state when a state of charge of the dark start energy storage resource falls below a predefined state of charge threshold during the grid power outage condition.

6. The bidirectional energy transfer system as recited in claim 1, wherein the home energy management system includes a recovery circuit configured for exiting the home energy management system from the hibernation mode.

7. The bidirectional energy transfer system as recited in claim 6, wherein the recovery circuit is configured to command a switch of the home energy management system to a closed state that connects the dark start energy storage resource to a downstream load to exit the hibernation mode.

8. The bidirectional energy transfer system as recited in claim 7, wherein the recovery circuit includes a manually actuated switch.

9. The bidirectional energy transfer system as recited in claim 7, wherein the recovery circuit includes a communication line adapted to deliver a trigger signal from an electrical vehicle supply equipment (EVSE) to the switch.

10. The bidirectional energy transfer system as recited in claim 7, wherein the recovery circuit includes a low power timer circuit configured to send a trigger signal to the switch when a time window has expired.

11. The bidirectional energy transfer system as recited in claim 10, wherein the time window is a learned time window.

12. The bidirectional energy transfer system as recited in claim 6, wherein the control module is further programmed to initiate communications between an electric vehicle supply equipment (EVSE) and an electrified vehicle after exiting the hibernation mode.

13. A method, comprising:
commanding a home energy management system to enter a hibernation mode during a grid power outage condition when a dark start energy storage resource reaches a low power state,
wherein, during the hibernation mode, the dark start energy storage resource is disconnected from all system loads associated with the home energy management system.

14. The method as recited in claim 13, wherein the dark start energy storage resource reaches the low power state when a state of charge of the dark start energy storage resource falls below a predefined state of charge threshold during the grid power outage condition.

15. The method as recited in claim 13, wherein commanding the home energy management system to enter the hibernation mode includes:
commanding a switch of the home energy management system to an open state that disconnects the dark start energy storage resource from the system loads.

16. The method as recited in claim 13, comprising:
commanding the home energy management system to exit the hibernation mode when a vehicle has returned or is expected to soon return to a structure associated with the home energy management system.

17. The method as recited in claim 16, wherein commanding the home energy management system to exit the hibernation mode includes:
commanding a switch of the home energy management system to a closed state that reconnects the dark start energy storage resource to the system loads.

18. The method as recited in claim 17, wherein the switch is transitioned to the closed state when a button is manually actuated.

19. The method as recited in claim 17, wherein the switch is transitioned to the closed state in response to a trigger signal received from a communication line from an electric vehicle supply equipment (EVSE).

20. The method as recited in claim 17, wherein the switch is transitioned to the closed state in response to a trigger signal received from a low power timer circuit.

* * * * *